United States Patent [19]

Bishop et al.

[11] Patent Number: 4,618,297

[45] Date of Patent: Oct. 21, 1986

[54] METHOD AND APPARATUS FOR MACHINING RACKS FOR STEERING GEAR

[75] Inventors: Arthur E. Bishop, 17 Burton St., Mosman, N.S.W., Australia; Klaus J. Roeske, Beverley Hills, Australia

[73] Assignee: Arthur E. Bishop, Mosman, Australia

[21] Appl. No.: 632,662

[22] Filed: Jul. 20, 1984

[30] Foreign Application Priority Data

Jul. 21, 1983 [AU] Australia .............................. PG0399

[51] Int. Cl.⁴ .......................... B23D 37/06; B23F 1/08
[52] U.S. Cl. .......................................... 409/58; 51/35; 51/45; 51/93
[58] Field of Search .................. 409/48, 42, 46, 58; 51/45, 93, 35

[56] References Cited

U.S. PATENT DOCUMENTS 2,578,187 12/1951 Hill et al. .............................. 409/48

FOREIGN PATENT DOCUMENTS

518354 7/1979 Australia .
3277699 4/1981 U.S.S.R. .
1028437 7/1983 U.S.S.R. ............................... 409/48

Primary Examiner—Douglas D. Watts
Attorney, Agent, or Firm—Hill, Van Santen, Steadman & Simpson

[57] ABSTRACT

A machine for cutting the teeth of a rack for a variable ratio rack and pinion steering gear employing a helical pinion having a plurality of identical teeth engaged with a rack having some tooth gaps of varying form and angular disposition to the rack axis, the machine having a spindle carrying a tool with a single cutting tooth having cutting edges which lie on the surface of a single tooth of the helical pinion; the spindle is arranged for helical reciprocation in a housing between two predetermined limits about a mid position in which the tool is directed normally to the plane of the teeth of the rack, a rack holding fixture, the fixture or the housing being moveable with a relative translatory curvilinear motion during the cutting of a gap of the rack, the motion for any one gap being a part of the locus of the helical pinion when slid without rotation in the same gap of the rack.

4 Claims, 9 Drawing Figures

METHOD AND APPARATUS FOR MACHINING RACKS FOR STEERING GEAR

The present invention relates to a method and apparatus for machining teeth for variable ratio racks.

Australian Pat. No. 462,162 describes a rack and pinion steering gear employing a regular helical pinion meshing with a rack having regions along its length where the teeth are of continuously varying pitch, pressure angle and tooth inclination angle, even along the length of a single tooth.

As explained in that patent, such a rack can be generated only by a cutter which is itself a facsimile of the pinion, and which is caused to roll along the rack while cutting according to the desired variable pitch relationship, a method which is not suited to mass production because of limitations imposed on the design of the cutter. Steering pinions generally have a steep helix angle and a relatively small root diameter of only 10 to 12 mm, and thus a cutter of similar proportions is too weak to be used for rapid or precise machining. Even if such a cutter could be made and adequately supported for this purpose, it could only be used once, as the "side taper" needed for cutting clearance would mean that once the cutter was sharpened it would be of smaller diameter and no longer be a facsimile of the pinion.

Australian Pat. No. 515,059 proposes that the problem of manufacture in production might be overcome by rough broaching the teeth of such racks to approximately their finished form, and subsequently finishing them by cold forming as, for example, in the die described in Australian Pat. No. 518,354. Alternatively such racks may be precision forged in a single-step process as described in co-pending PCT Application No. PCT/AU83/00073. However, each of the above methods require that one element of the die has a cavity therein which is the obverse of the toothed area of the rack, and such a cavity can only be produced by E.D.M. erosion by an electrode, generally of copper, which is itself similar to the rack. Prior to this invention such electrodes could not be machined by cutting by facsimile generation, and hence are currently made by electro-plating a plastic impression taken from a master steel rack. This master is itself eroded by an E.D.M. process in which an electrode which is a copper facsimile of the pinion is rolled along the rack in the desired variable pitch relationship, a process which takes many hours. The weakness of the 'facsimile' pinion electrode is not significant in the case of the E.D.M. erosion process, as there are no cutting loads. Note that the copper electrode used to cut the die cannot itself be so manufactured, since copper cannot be eroded by the E.D.M. process.

The method just described involves many stages each of which loses some accuracy and is time consuming and expensive.

The present invention provides a means of cutting copper electrodes for the manufacture of such forging dies directly, eliminating the need for the various intermediate steps just referred to.

While it is still not suited to true mass production it is rapid enough to be used for small scale manufacture. It is also suited to the making of masters needed for production inspection having a higher order of accuracy than can be achieved by any presently known process.

At first glance it might be thought that such gap by gap generation would be inefficient as compared to accepted gear generating processes whereby the cutter generates several tooth grooves of the gear or rack simultaneously.

However, in the case of variable ratio racks the limitations placed on the design of the cutter referred to earlier are such that far more is to be gained by using the most practical cutter than is lost by cutting the tooth gaps separately.

The cutter has a single cutting tooth, the cutting edges of which lie on the surface on one tooth of the pinion to which it relates. The cutter can readily be resharpened without error of geometry and is rigidly supported by the cutting spindle of the machine.

The means in a preferred form further provides that the cutting spindle and cutter are reciprocated in a helical manner, the angle of oscillation of the spindle being always less than 180° but sufficient that the cutting edges of the tool lie above the plane of the tops of the rack teeth at both ends of its reciprocation. The minimum angle of oscillation will generally be at least 130°. As the top face of the rack is usually very close to the spindle axis, and hence occupies an angle in section about that axis approaching 180°, it follows that the spindle may have an extension over the top of the rack being cut of an included angle in section not exceeding about 50° (360° less the sum of 180° and 130°). Such an extension of the spindle allows the cutting edges of the tool to be well supported in a manner not possible if a conventional multi-toothed helical type tool is used, stroked over the full width of the rack at each reciprocation, as demanded by such a cutter.

The means in a preferred form also provides a tool retraction system whereby, on completion of the forward cutting stroke, the tool moves radially toward the axis of the spindle to provide clearance with the work during the return stroke. In conventional gear cutting machines the whole spindle moves away from the rack or vice versa during the return stroke, but such retraction is not appropriate in single tool cutting where the angle of oscillation is large as in this case.

A further aspect of the means to be described is that, as the tool and spindle perform their helical reciprocation, the rack is moved along a translatory Curvilinear Locus with respect to the spindle so that the tool cuts one gap at a time, starting each gap at one side of the rack and progressing to the other. This motion is characterised in that the rack maintains at all time parallelism of its axis to that which occurs at any other time. For most gaps this translatory curvilinear motion will follow a path dictated by the changing pitches characteristic of the variable ratio rack being produced. The tool will thereby produce gaps having changing pressure angles along their length, changing pressure angles within the height in section of a single tooth and of differing section in opposed sides of the gaps. This total lack of symmetry means that the grooves have no centre-line and it is therefore difficult to describe the curvature of such gaps. The term "Curvilinear Locus" will be used to refer to the path and several means of generating this path will be described.

Finally, the means in a preferred form to be described also provides that, while cutting successive gaps along the rack, the rack is moved a small amount towards and away from the cutter axis in such a manner that the teeth in the centre, straight-ahead driving position are of tighter mesh with the pinion when installed in the steering gear than those towards the ends of travel. The manner in which the rise and fall is accomplished is consistent with that described in the co-pending U.S. patent application No. 333,421.

The present invention consists in a machine for cutting the teeth of a rack for a variable ratio rack and pinion steering gear employing a helical pinion having a plurality of idential teeth engaged with a rack having some tooth gaps of varying form and angular disposition to the rack axis said machine comprising a spindle adapted to carry a tool with a single cutting tooth having cutting edges which lie on the surface of a single tooth of said helical pinion, said spindle being arranged for helical reciprocation in a housing between two predetermined limits about a mid position in which said tool is directed normally to the plane of the teeth of said rack, a rack holding fixture and means for moving said fixture or said housing with relative translatory curvilinear motion during the cutting of a gap of said rack said motion for any one said gap being a part of the locus of said helical pinion when slid without rotation in the same said gap of said rack. It is preferred to provide means for retracting said tool away from the rack being cut in a radial direction towards the axis of said spindle at the end of each cutting stroke.

Said means for moving said fixture or housing can comprise a cam. Alternatively said means for moving said fixture or housing can comprise two or more numerically controlled servo-motors driving lead screws to impart to said fixture relative motion with respect to said housing to produce said translatory curvilinear motion.

The present invention further comprises a method for cutting the teeth of a rack for a variable ratio rack and pinion utilizing a machine as defined above.

In order that the nature of the invention may be better understood a preferred form thereof is hereinafter described, by way of example, with reference to the accompanying drawings in which.

Figure 1:
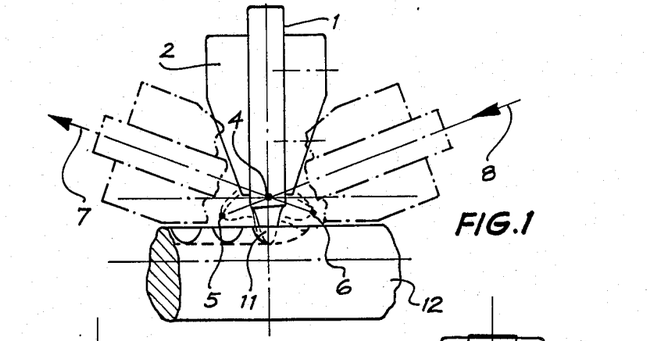
FIG. 1 is an end elevation of a portion of a rack being machined by a machine according to the invention.
Figure 2:
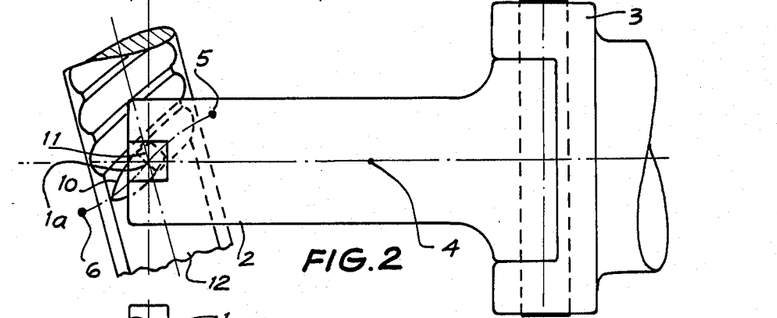
FIG. 2 is a plan view of the parts depicted in FIG. 1.
Figure 3:
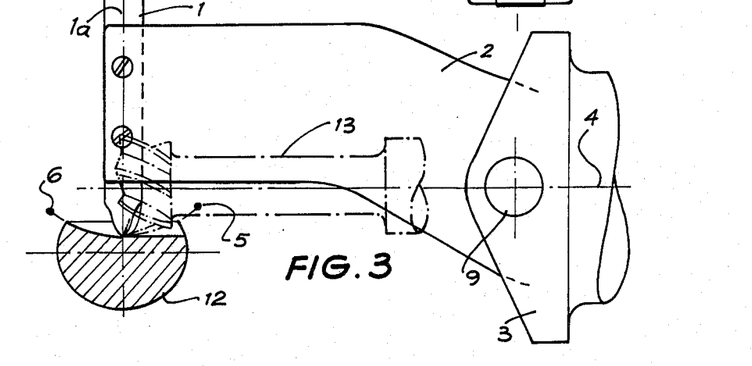
FIG. 3 is an elevation of the parts depicted in FIG. 1.

According to the method and machine to be described, the tooth gaps are generated one at a time by a single cutting tool reciprocated in a helical path and progressively moved across the width of the rack in accordance with a predetermined geometrical law. FIGS. 1, 2 and 3 show cutting tool 1 secured in tool holder 2 which is an extension of spindle 3 having axis 4. For the case illustrated the helix is right-handed.

During the cutting stroke the tool moves in a helical path along and about axis 4, commencing at 5 and finishing at 6.

Note that if a conventional cutting tool were used, having several cutting edges it would have to be of the proportion shown chain dotted as at 13 in FIG. 3. The stem would have to be as long as shown in order that, at the last instant of generation corresponding to about point 6, the cutter would still have to be able to make a full working stroke forward while clearing its shank of rack 12. Such a cutting tool would clearly be only a small fraction as strong as the configuration shown according to the invention. A further disadvantage of the conventional arrangement is due to the side taper illustrated on cutter 13. Once the front faces of the tool had been re-sharpened it would no longer be a facsimile of the pinion, whereas tool 1 may be re-sharpened on its cutting edges and moved downward in tool holder 2.

Tool holder 2 pivots in spindle 3 about pin 9 at each end of the reciprocation of the spindle, causing the tool to move in direction 7 (FIG. 4) when it reaches position 6 and in direction 8 when it reaches position 5. By this means the tool returns after helical forward cutting stroke 5-6 in a helical path 6a - 5a (not shown) clear of the surface which has just been cut.

Cutting face 11 of tool 1, having a centreline 1a will have the appearance of a section through one pinion tooth and, during each cutting stroke, will sweep out an envelope below the surface of rack 12 which is a part-spiral "trough".

Figure 4:
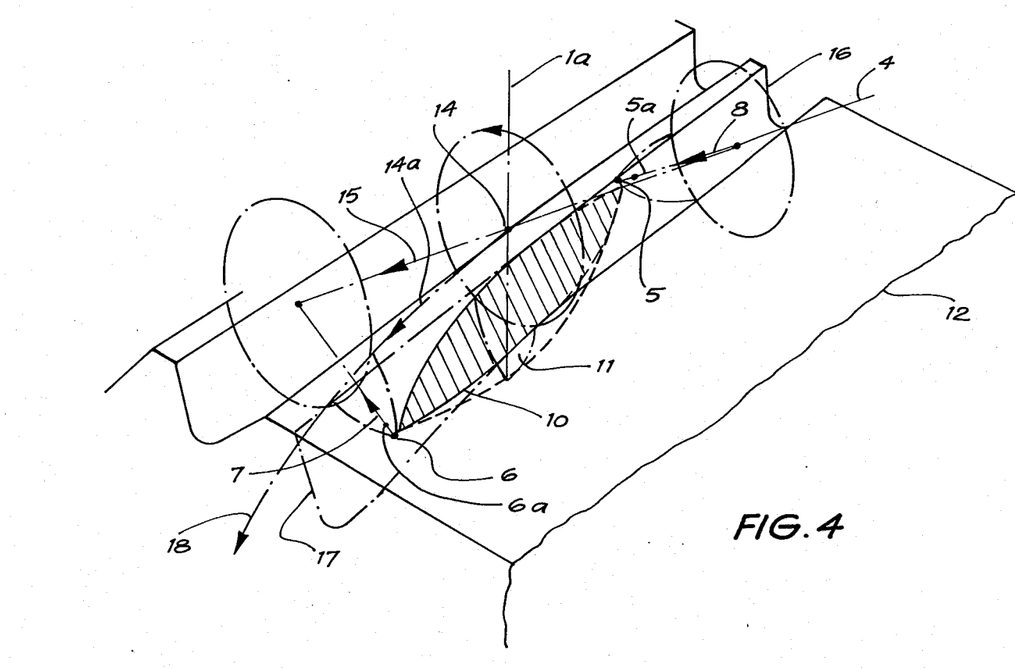
FIG. 4 is a perspective view to an enlarged scale of a portion of a rack being machined illustrating the action of the cutting tool.

The exact manner in which "trough" 10 generates the rack gaps is set out in FIG. 4, which is an enlarged view of the instant of cutting illustrated in FIGS. 1-3, that is where cutting tool 1 is directed normally to the plane of the teeth of the rack.

Here reciprocation of the tool along axis 4 combined with counter-clockwise rotation (i.e. right-handed spiral motion) carries the tool point from initial position 5 at the start of the cutting stroke to final position 6. Retraction of the tool during the return stroke is here illustrated by the space between points 6 and 6a, and on completion of the return stroke to point 5a the tool moves in direction 8 the distance 5a-5 to resume the position for commencement of cutting. The intersection of cutting face centreline 1a and spindle axis 4 for the position when the tool is normal to the plane of the rack teeth is designated 14. During each cutting stroke point 14 moves along a path 18 some small distance, here greatly exaggerated to 14a so as to cause "trough" 10 to progress across the rack. The changing direction of 18 will cause the "trough" to produce a tooth gap having along its length as, for example, a "U" section or form at the starting end thereof as at 16 and a "V" section or form at the other end as at 17. The pressure angle of the "U" section will, of course, be less than that of the "V" section, which is consistent with the changing pitch of the teeth. The rules governing the selection of Curvilinear Locus 18 will now be discussed with reference to FIG. 5. Here pinion 20, having axis 21, is seen lying above the rack having axis 19. The pinion is removed in the area where it crosses the rack and is shown greatly exaggerated in length for the sake of clarity. The rack lies at an angle 22 to the normal to the pinion axis 21, generally known as the installation angle. The position shown here illustrates the centre mesh position of a steering gear in which the steering ratio is lowest on centre and becomes progressively higher towards the lock, so that pitch distance on the rack axis 23-24 is greater than pitch distance 24-25 etc. until a minimum pitch distance 28-29 is reached. Along the pinion axis 21 equal increments of length 23-34, 34-35, . . . 38-39 are set out representing the axial pitch of the pinion. Through point 34 a line is now drawn parallel to rack axis 19, and through point 24 a line is drawn parallel to pinion axis 21, which lines intersect at point 44. Similarly the lines originating in successive axial pitch points will intersect lines drawn through the centres of the tooth gaps respectively, providing a series of intersection points, the last of which is point 49. Curved line 50 is now drawn passing through these intersections, commencing at 23 and finishing at 49. For the sake of this example it is assumed that the pitch of the teeth on the rack axis does not increase after point 29 and hence it follows that, whereas line 23-49 is curved, its extension 51 beyond point 49 is straight.

Figure 5:
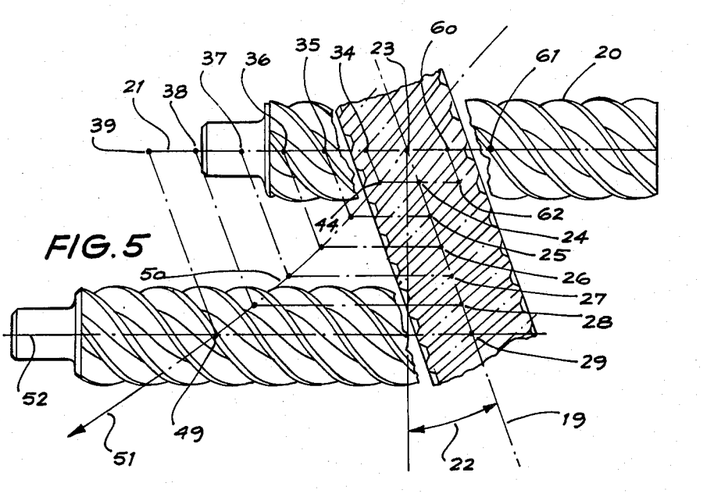
FIG. 5 illustrates diagrammatically the method of selecting the Curvilinear Locus of movement of the rack during cutting.

Two types of relative motion between pinion and rack need be considered. Firstly the pinion may rotate as in the steering gear and move along axis 19. For the six toothed pinion illustrated here, one revolution will be required to move from point 23 to point 29.

The second possible relative movement is if the pinion is slid, without rotation, along the rack teeth while keeping its axis parallel to initial position 21 until it reaches position 52. The pinion will then have travelled along line 50, which has been termed for the sake of this description, the Translatory Curvilinear Locus. A part of this Curvilinear Locus is shown as 18 in FIG. 4.

Figure 6:
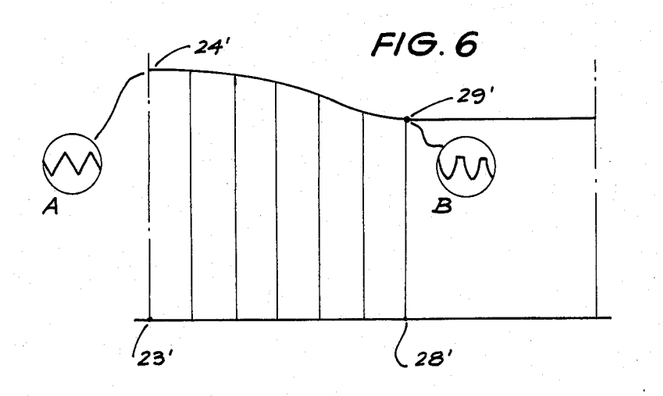
FIG. 6 is a diagram showing the relationship between tooth pitch pinion rotation for a particular steering gear.

The method of setting out successive points 24 to 29 along the rack axis may be understood with reference to FIG. 6.

This plot shows the relationship between the rack tooth pitch (the vertical ordinate) and the pinion rotation (the horizontal ordinate) for one full revolution of the pinion from the centre straight-ahead driving position. Thus the vertical distance on the plot 23'-24' shows at an enlarged scale the travel of the rack for the first 1/6 turn of the pinion from centre, and the vertical distance 28-29 is the travel of the rack for the last 1/6 turn of the pinion from centre and the vertical distance 28-29 is the travel of the rack for the last 1/6 turn of the pinion prior to 1 full turn.

Again it will be seen, for the case illustrated, the pitch of the rack teeth remains constant after 1 turn.

Having selected a suitable characteristic for the curve, a smooth curve is drawn through points 24' to 29' and the successive intersections of the vertical lines representing progressive rotation of the pinion are drawn. These vertical lines, at a suitable scale, are used to set out points 23 to 29 in FIG. 5.

Note that the teeth of the rack will progressively change between gap 23 on-centre and gap 29, both in respect of their section (see scrap views A and B respectively in FIG. 6) and in respect to their inclination to the rack axis and their curvature along their length (FIG. 5).

In fact, the curvature and inclination of each tooth gap will roughly follow the direction of line 50. It is important to note that, when the pinion centre mesh tooth slides along curved line 50 from point 23 to point 44, the centre mesh point of the pinion tooth one axial pitch to the right of point 23, namely point 60, simultaneously slides to point 24 and similarly third mesh point 61 slides to point 62. It follows that the section of the centre tooth gap 23-44 is identical in every respect to that part of the first tooth gap of the rack below the centre tooth, namely from 60 to 24, and is again identical with that short part of the third tooth gap between points 61 and 62. In other words the sections of the Curvilinear Locus, and also the forms of the tooth gaps, repeat in successive teeth spaced just one axial pitch of the pinion apart. This important property of variable ratio racks will be utilised in the machine to be described.

Figure 7:
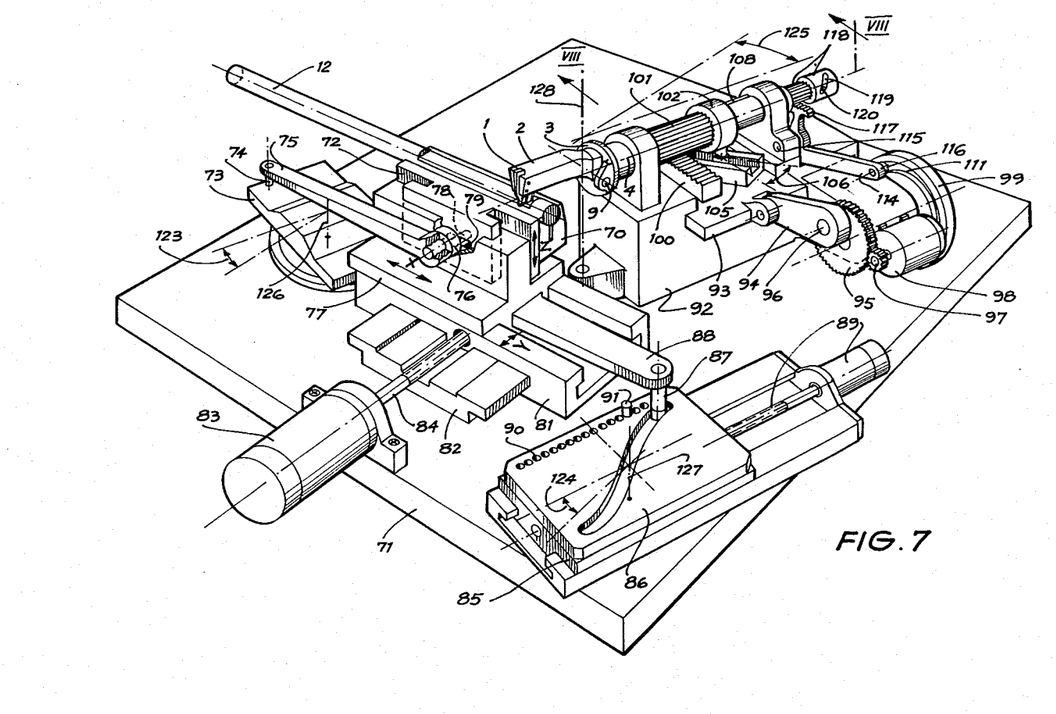
FIG. 7 is a perspective view of a machine according to the invention.

FIG. 7 is a schematic perspective view of the machine. Rack 12 (shown during the cutting of one of the first teeth) is gripped in fixture 70. During cutting of the teeth of the rack, it is moved relative to the base 71 of the machine in 3 directions simultaneously, here designated "X", "Y" and "Z". For each direction a slide and slideway is provided together with appropriate mechanisms to control the several motions according to the desired laws as will be described.

Vertical motion "Z" of fixture 70 is provided for by its travel in slideway 72 under the control of three dimensional cam 73. Follower 74, attached to lever 75, moves across the surface of cam 73 in accordance with the "X" and "Y" motions imparted to slideway 72 and causes lever 75 to rise and fall through some small angle about the axis of pivot pin 76.

Pivot pin 76 journalled in slideway 77 and has an eccentric extension 78 which enters a slot 79 in fixture slideway 72. The weight of lever 75 is such as to cause follower 74 to contact cam 73 at all times. This "Z" motion, termed "rise and fall", serves to control mesh centre distance of the rack being cut to the pinion when installed in the steering gear, and is typically only about 0.1 mm. It is important that this "rise and fall" of the rack teeth is oriented to the rack axis in the same manner as is the pinion as described in the abovementioned copending Patent Application.

"X" slide 77 moves in a slideway journal in "Y" slide 81 which later slides in a slideway 82 attached to main base 71.

The "Y" slide 81 is driven by motor 83 and leadscrew 84.

The "X" slide is moved by follower pin 87 which protrudes from lug 88 of slide 77 and engages cam 86 mounted on cam slide 85.

Cam 86 does not move during cutting of each tooth, but is indexed or moved relative to the cam slide 85 on which it is mounted slideably in equal steps after the completion of cutting of each tooth gap. This may be accomplished by indexing the cam a fixed amount each time by an amount equal to the axial pitch of the pinion, (distance 34-23 of FIG. 5) either manually or by a suitable servo-motor and leadscrew 89. For manual operation it may suffice to provide cam 86 with a series of holes 90 precisely spaced by the pinion axial pitch distance, and move pin 91 from hole to hole. In this case cam slide 85 and servo-motor and leadscrew 89 are not required, and cam 86 remains fixed relative to base 71 during the cutting of a gap.

Cutting tool 1 is secured in tool holder 2, which effectively forms part of spindle 3 during the cutting stroke. At the end of each stroke, however, tool holder 2 pivots about pin 9 through a small angle to clear the tool of the rack gap being cut during the return stroke.

Spindle 3 oscillates in journals provided in cutting head 92 both axially and rotationally through the action of crosshead 93. This crosshead is reciprocated in a slideway provided in cutting head 92 under the action of connecting rod 94, driven by crank pin 96, secured to crank disc 95, which is rotated in some suitable manner such as by motor 98 and pinion 97. The shaft (not shown) carrying crank disc 95 is journalled in an extension of cutting head 92 and carries at the end opposite to crank disc 95, a cam 99.

Crosshead 93 carried rack 100 which engages gear 101 cut on spindle 3.

Spindle 3 (see FIG. 9) also carries, journalled thereon, member 102 having pin 103 engaging slot 104 in pin slide 105 secured, at some angle 106 to the line of travel of crosshead 93.

Figure 8:
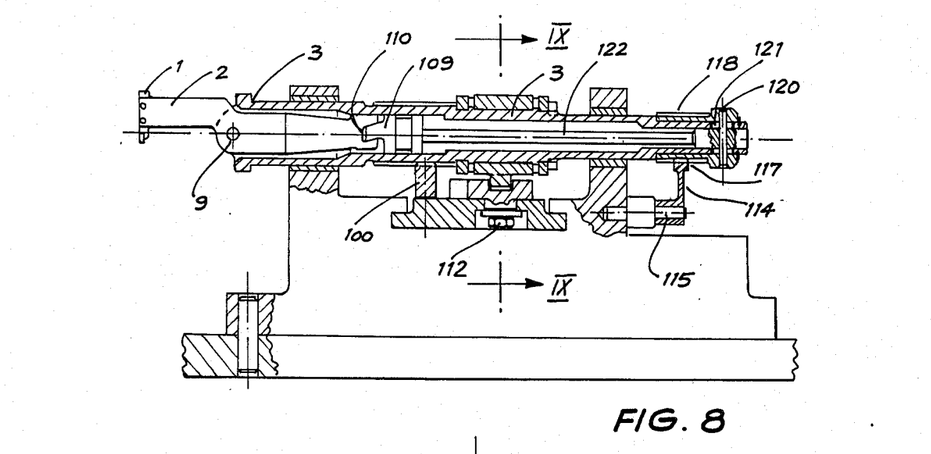
FIG. 8 is a sectional elevation on plane VIII—VIII of FIG. 7.
Figure 9:
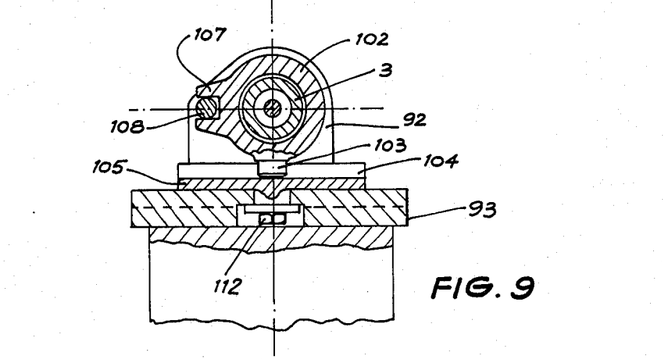
FIG. 9 is a section on line IX—IX of FIG. 8.

The construction of member 102 and pin slide 105 is better shown in FIG. 8 and FIG. 9.

Pin slide 105, having been set at a predetermined angle 106, is securely locked to crosshead 93 by nut 112.

Member 102 must be prevented from rotating about the spindle axis and for this purpose has a forked extension 107 which is guided on pin 108 secured in housing 92.

It will be seen that, as crosshead 93 is reciprocated through some set stroke by crank 94 it will cause spindle 3 to oscillate through some set angle, generally about 130° as mentioned previously.

However reciprocation of crosshead 93 also causes member 102 to be driven axially on axis 4 so causing simultaneous axial reciprocation of the spindle 3 and the amount of such reciprocation will depend on the angle 106 of the pin slide to its direction of reciprocation. For the example shown pin slide 105 has been set and locked counter-clockwise from its line of travel in plan view, so that spindle 3 will execute a right-handed spiral.

If pin slide 105 had been rotated clockwise the spindle would execute a left-handed spiral.

By this means racks may be cut to suit many different pinions having either left or right spirals of different lead lengths.

One further aspect of operation of the tool spindle is illustrated in FIG. 8.

Here tool holder 2 is shown in its cutting position where it is held securely by wedge 109 which engages angled slot 110 formed in the end of tool holder 2.

Movement of wedge 109 away from pin 9 will cause the slotted end of the tool holder 2 to be driven downward until it contacts the opposite side of the bore of spindle 3 so raising tool 1 in the manner illustrated in FIGS. 1 to 4.

Wedge 109 is driven a small distance axially in spindle 3 at each end of the stroke thereof, notwithstanding the axial and rotational oscillation of the spindle by the action of cam 99 in a manner now to be described.

Bell-crank lever 114 pivotted to housing 92 on pin 115 carries follower pin 116 engaged in the track 111 of cam 99 and at its other end, gear sector 117 which engages cam gear 118 journalled on spindle 3 while still engaged with gear sector 117.

Note that the teeth of cam gear 118 are elongated so permitting its axial movement with spindle 3.

Cam gear 118 has a helical slot 119 which engages pin 120 which passes through an axial slot 121 in spindle 3 and then through a hole in draw rod 122. This draw rod extends axially inside the spindle and is attached to wedge 109.

Now the track 111 of cam 99 changes radius suddenly in the region of rotation of crank 95 associated with extremes of travel of crosshead 93 and spindle 3, that is when the tool 1 is clear of the cut as at positions 5 and 6. This sudden change of radius causes follower pin 116 to move suddenly down, in FIG. 7, and gear sector 117 to rotate cam gear 118 through some additional angle relative to spindle 3 (which is nearly stationary at the instant being referred to) so producing an axial travel of pin 120. This, in turn, drives draw rod 122 either forward or back so causing motions of the tool in directions 7 and 8 (FIGS. 1-3).

It will be seen that three-dimensional cam 73, cam slideway 85 and cutting head 92 are all swung through equal angles 123, 124 and 125 about pivots 126, 127 and 128, relative to the normal to the axis of rack 12. This angle exactly corresponds to the pinion installation angle 22 of FIG. 5. By this means all those features of the rack which relate to the pinion are correctly orientated, for example the segments of locus 50 which are disposed in successive tooth gaps according to the pinion axial pitch, the rise and fall of the rack mesh centre distance, and the correct shape of "trough" 10.

One manner of operating the machine will now be described.

In the commencing position, motor 83 has positioned the slide 81 furthest from the cutting head. Cam 86 is positioned in its extreme position down and to the left in FIG. 7 by virtue of pin 91 being inserted in the first of holes 90 (not the third as shown in FIG. 7).

The work is thereby positioned suitably to commence the cutting of the first tooth of the rack. Motor 98 is now started and the tool reciprocates in its helical path clear of the work. Motor 83 is started and the slide moves slowly towards the tool and continues until the first gap is machined. The necessary axial travel of the rack will occur because follower pin 87 engaging the cam 86 will impart the necessary part of the locus 18 to slide 77. When cutting of the first gap is complete motor 83 stops and motor 98 stops in a position such that the tool is clear of the work (e.g. position 6 of FIG. 1). The motor 83 now reverses and quickly traverses the slide 81 back to its initial position.

Cam 86 is now indexed one hole by moving pin 91 to the second of holes 90 (a distance equal to the pinion axial pitch), and the cycle is repeated until all tooth gaps are machined.

Three dimensional cam 73 will have imparted the necessary "rise and fall" motion to the rack as referred to earlier.

Alternatively if manually-indexed cam arrangement is replaced by motor and leadscrew 89, and if this motor is arranged to index the cam slide 85 each time that motor 83 returns slide 81 to its starting position ready to cut the next tooth, then the entire sequence of cutting a rack will occur automatically.

In a further variation, not illustrated, the motions of slides 81 and 77 may be arranged to be actuated by servo-motors and leadscrews controlled by a numerical controller. The necessary information may be imparted to this controller from a punched tape which contains all the co-ordinate information contained in cam 86 and pitched index holes 90. The operation of such a machine would also be automatic.

In a further refinement, vertical slide 72 may be operated by a further servo-motor receiving information from the above N.C. controller. In this case the z motion may be used to clear the tool of the rack being cut at the completion of each tooth without the need to stop motor 98 in a discrete position.

Many other variations are possible which do not, however, depart significantly from the basic concept of generation outlined above.

We claim:

1. A machine for cutting the teeth of a rack for a variable ratio rack and pinion steering gear employing a helical pinion having a plurality of identical teeth engaged with a rack having some tooth gaps of varying form and angular disposition to the rack axis, said machine comprising a base, a spindle adapted to carry a tool with a single cutting tooth having cutting edges which lie on the surface of a single tooth of said helical pinion, a housing on said base, means supporting said spindle for helical reciprocation in the housing between two predetermined limits about a mid position in which said tool is directed normally to the plane of the teeth of said rack, a fixture supporting said rack on the base and means for relatively moving said rack and said tool with translatory curvilinear motion during the cutting of a gap of said rack, said motion for any one said tap being a part of the locus of said helical pinion when slid without rotation in the same said gap of said rack.

2. A machine as claimed in claim 1 wherein means are provided for retracting said tool away from the rack being cut in a radial direction towards the axis of said spindle, at the end of each cutting stroke.

3. A machine as claimed in claim 1, wherein said means for relatively moving comprises a cam.

4. A machine as claimed in claim 1, wherein said means for relatively moving comprises two or more numerically controlled servomotors driving lead screws to impart to said fixture relative motion with respect to said tool to produce said translatory curvilinear motion.

* * * * *